(12) United States Patent
Armatis et al.

(10) Patent No.: US 6,697,822 B1
(45) Date of Patent: Feb. 24, 2004

(54) METHOD OF MAINTAINING DATABASE RECORDS

(75) Inventors: Kathleen C. Armatis, Stillwater, MN (US); Carol E. Herzberg, Afton, MN (US); David B. Schrader, White Bear, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/326,859

(22) Filed: Jun. 7, 1999

(51) Int. Cl.[7] ............................................. G06F 17/30
(52) U.S. Cl. ..................... 707/204; 707/102; 707/202; 707/203; 707/205; 707/5; 707/8; 707/10
(58) Field of Search ............................. 707/8, 10, 201, 707/202, 204, 5, 102, 203, 205; 709/206, 218, 201; 379/265.13

(56) References Cited

U.S. PATENT DOCUMENTS

| | | | | |
|---|---|---|---|---|
| 5,594,900 A | * | 1/1997 | Cohn et al. | 707/204 |
| 5,682,535 A | * | 10/1997 | Knudsen | 717/117 |
| 5,794,252 A | * | 8/1998 | Bailey et al. | 707/102 |
| 5,799,323 A | * | 8/1998 | Mosher, Jr. et al. | 707/202 |
| 5,835,915 A | * | 11/1998 | Carr et al. | 707/202 |
| 5,924,096 A | * | 7/1999 | Draper et al. | 707/10 |
| 5,970,488 A | * | 10/1999 | Crowe et al. | 707/8 |
| 5,999,932 A | * | 12/1999 | Paul | 707/10 |
| 6,012,087 A | * | 1/2000 | Freivald et al. | 709/218 |
| 6,023,723 A | * | 2/2000 | McCormick et al. | 709/206 |
| 6,061,686 A | * | 5/2000 | Gauvin et al. | 707/10 |
| 6,073,140 A | * | 6/2000 | Morgan et al. | 707/203 |
| 6,073,167 A | * | 6/2000 | Poulton et al. | 709/206 |
| 6,105,023 A | * | 8/2000 | Callan | 707/5 |
| 6,122,630 A | * | 9/2000 | Strickler et al. | 707/8 |
| 6,216,135 B1 | * | 4/2001 | Brodersen et al. | 707/201 |
| 6,304,882 B1 | * | 10/2001 | Strellis et al. | 707/202 |
| 6,404,884 B1 | * | 6/2002 | Marwell et al. | 379/265.13 |
| 6,584,477 B1 | * | 6/2003 | Mosher, Jr. | 707/204 |

OTHER PUBLICATIONS

Farcet et al., "Space–scale structure for information rejection in large–scale distributed virtual environments", IEEE, 1998, pp. 276–283.*

* cited by examiner

Primary Examiner—Thuy N. Pardo
(74) Attorney, Agent, or Firm—Dean M. Harts; Douglas B. Little

(57) ABSTRACT

The present invention provides a way of managing databases when updating records in a local database where individual records in a source database are changed on a regular basis, but each record maintains a consistent unique record identifier. The first time a reviewer reviews a record resulting from a search, the reviewer accepts or rejects the record. If the record reappears in future additions to the database, e.g., as a result of an update to the record, rejected records will be filtered before ever reaching the reviewer. Previously reviewed and accepted records can either be sent directly to a local database (again by-passing the reviewer) or forwarded to the reviewer if a significant field has been updated. In this manner the reviewer always sees brand new records, but avoids seeing updated versions of previously reviewed records unless some portion of the data has been updated which the reviewer considers significant. Local database users see only a single, fully updated version of each record.

11 Claims, 2 Drawing Sheets

METHOD OF MAINTAINING DATABASE RECORDS

BACKGROUND OF THE INVENTION

1. Technical Field

The present invention relates to maintaining databases, and in particular to maintaining database records where the contents of individual records in a source database are changed from time to time.

2. Description of the Related Art

With most commercial databases, a new record is created each time new data is added to the database. For example, a newspaper database almost never removes or modifies a record relating to an existing article. Instead, when a new article is published or the same article is republished at a later time with modifications, a new record is added for that new article.

There are a few databases in which the data in individual records are modified from time to time. For example, the Derwent World Patent Index (WPI) and INPADOC patent databases and the Dun & Bradstreet ("D&B") and Thomas Register business databases have one record relating to each particular subject. For example, the D&B and Thomas Register databases maintain a record for each company. The Derwent and INPADOC databases maintain records for each patent family.

New records are added for completely new items, e.g., new businesses or patents families, but when information needs to be updated in these databases, the data in the individual fields within a record are modified. For example, when a new patent issues in a previously reported patent family, new international patent classification codes are assigned, new cross-references are identified or new priority information made public, or a patent family is re-assigned, a Derwent record will be updated to add the appropriate information to the necessary fields. Likewise, changes in address, officers, financial information or ownership may result in changes in fields within a record in a D&B financial database.

With such systems, the user may want to know how current the information is for a particular record. Therefore, the record or the database normally also includes a last modified date or some similar indication of the last time at which the record or the database was updated.

A common use for these types of databases is a current awareness search. For example, a scientific researcher may want to keep current on new patents, or a mail-order company many want to keep current on new addresses and companies in particular fields.

To conduct a current awareness search, a user of the database creates and saves a search. That search then is reapplied to the database periodically, e.g., weekly or monthly. The results of the search then are forwarded to the user for review.

Such current awareness searches normally search only the portion of the database that is new since the prior current awareness search, either by using a subset of the database that only includes the new information (such as a weekly update tape) or by filtering the results based on the last modified date information. Searching this way means that the search will pick up both new records and records which have been modified since the last current awareness search.

Unfortunately, this means that the user often sees essentially the same information repeatedly each time the current awareness search is run. To use the patent databases as an example, the database records are updated each time a new patent in the family is published or issued. A patent might be filed in 10 to 20 countries. Most countries outside of the United States publish the patent application at 18 months, and then again publish a notice when the patent is granted. This means an individual record may be updated 20 to 40 times for a particular family. The recipient of the current awareness search therefore will see essentially the same information with only minor changes 20 to 40 times.

Similarly, updates to business records may be as minor as changes in lower level officers, slight shifts in reported stock ownership or similar relatively minor pieces of information. Again, every time the information is updated, the user will see a new report.

In either situation, seeing essentially the same reports over and over is usually annoying. It is particularly annoying when the record is of no interest to the reviewer, but simply happens to be caught in the net of the terms used in the current awareness search.

In addition to the annoyance to the user, if a local database is being created to store results of these searches, it will become extremely large if each record is stored multiple times. A primary function of such a local database is to allow local searching of a smaller database. But a search against the local database will result in whole series of duplicative records containing what is overwhelmingly the same information, with minor changes from one record to the next.

SUMMARY OF THE INVENTION

The present invention avoids these problems in the prior art by using the unique record identifier or accession number that normally is present in these types of databases to limit repetition in what a reviewer sees and what is added to a local database.

Data may be received from source databases in a variety of ways. For example, a local database might be created by conducting a retrospective search of the entire source database, or an individual involved in the project for which the local database is being created may have a list of patents they have collected over time which they want included. It may then be maintained by running a current awareness search on a regular basis and by adding records which individuals involved in the project learn about through daily reading or interactions with others in their field.

Whatever the source of data, according to the present invention the first time data is added to the local database, at least one reviewer reviews each of the records and determines whether each record is of interest (accepts the record) or of no interest (rejects the record). The review may take place before or after the record is actually added to the database, depending on the situation, with the record deleted from the database if it is rejected in a subsequent review. Lists of the record identifiers of all records reviewed, and of all rejected records then are maintained.

On subsequent addition of data to the database, new records with record identifiers matching record identifiers of those on the previously reviewed list can automatically be processed without further interaction by a reviewer. If the record identifiers are on the rejected list, they will be ignored, i.e., not added to the database (or deleted from the database, if the records were all added before the review). If the record identifiers are not on the rejected list, then the record in the local database is updated with the revised information. In any case, the reviewer is not requested to accept or reject the updated versions of previously reviewed records again, but updated versions are available in the local database when local database users conduct a separate search of the local database.

In some situations, multiple reviewers will review particular sets of data. If so, preferably a record will be added to the reject list only if all reviewers reject it, or if a specific reviewer rejects it, or if not all reviewers accept it, depending on what is appropriate for the particular situation and local database. For example, a database of reference materials for a development team might add patent records to the reject list only if all reviewers reject the record, while a database of records of patents which are to be assigned to a third party as part of a sale of a business might add patent records to the reject list if any reviewer rejected the record.

Preferably, the reject list can be blanked and restarted if desired. For example, a database of reference materials may be created for a development team. The scope or focus of the team then changes. A new retrospective search is run, and future current awareness searches are modified. In this situation, what records are relevant may change, so the reject list is no longer relevant, and should be restarted.

Sometimes a reviewer may actually want to be notified if certain information in a record changes. According to a further aspect of the invention, the system can be arranged to check certain fields in each record. Updated records then will be passed through to the reviewer if the information in the specific fields is changed. For example, a reviewer might not care about who the current assistant secretary is in a company in a D&B report, but might be very interested in knowing about updated information on sales and operating income. The system therefore could be set up to check the sales and operating income fields, and pass the record on to the reviewer if those change, but merely to update the record in the local database if other fields change. Again, the reviewer will receive only information that is either new or of particular interest, but still have quick access to current information in the local database, when desired.

If significant fields are being checked, ideally an accept/reject decision list is maintained for each reviewer. Records which then have been rejected by a particular reviewer will not be sent to the reviewer even if significant fields are updated, but they will be sent to other reviewers who accepted those records.

It will also be appreciated that the local database now contains only a single, current copy of records which a reviewer has accepted. This means that searches of the local database by the reviewer or some other user will only produce a single copy of the current information for each record. Moreover, the local database now only contains records which at the least have not been rejected by some reviewer, plus, possibly, new records from the most recent lot of data being added which have not yet been reviewed. Searches run against the local database therefore will have minimal amounts of spurious records returned due to flukes in the scope of the search.

BRIEF DESCRIPTION OF THE DRAWING

The invention will be described with reference to the accompanying drawings, in which.

DETAILED DESCRIPTION OF THE PREFERRED EMBODIMENTS

Figure 1:
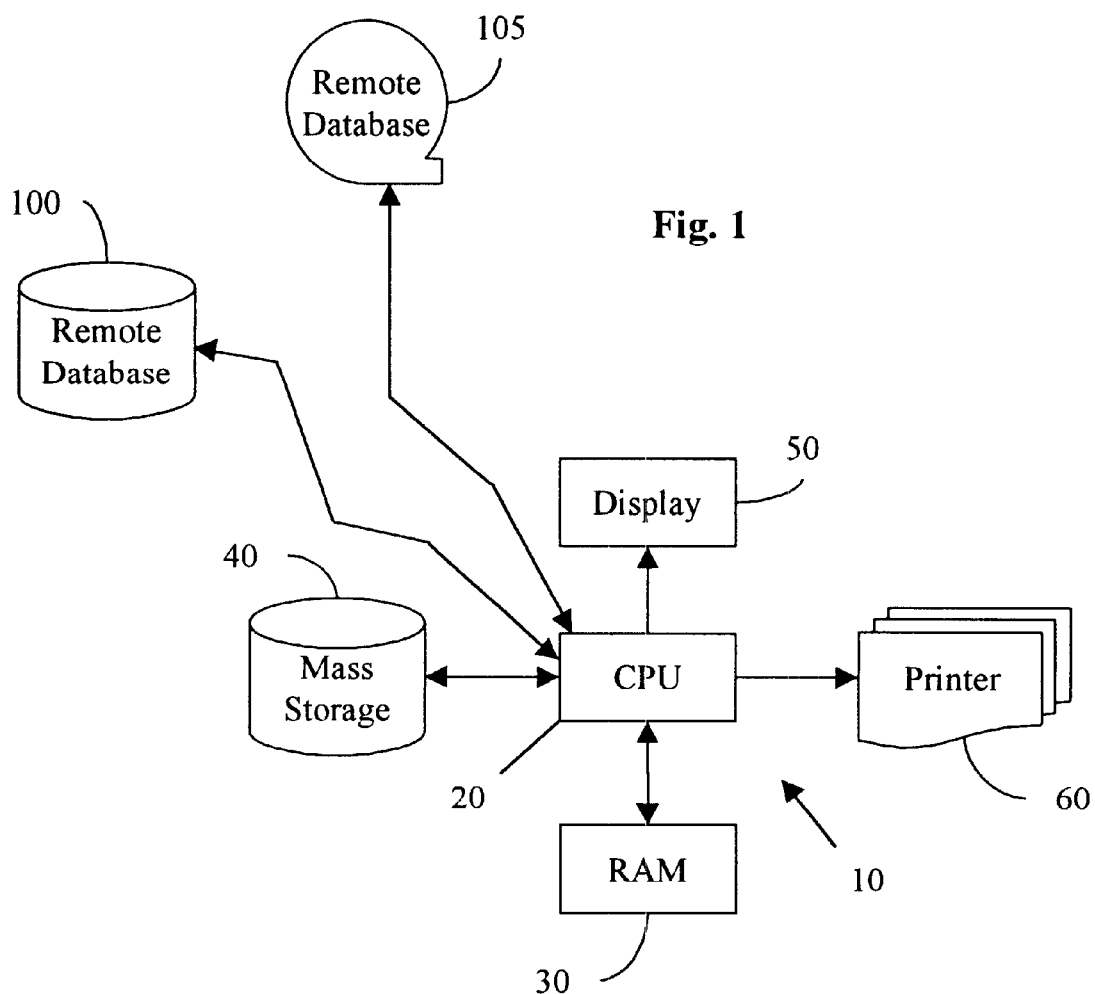
FIG. 1 is a schematic representation of a computer system upon which the present invention might be implemented.

Referring to FIG. 1, the computer system 10 includes at least one central processing unit (CPU) 20, random access memory (RAM) 30, at least one mass storage device 40 (such as a hard drive, CD-ROM drive, diskette drive or the like), at least one display 50 (such as a cathode ray tube, LED, LCD or plasma display) and at least one printer 60 (such as a dot matrix printer, a laser printer, or an ink jet printer), associated such that the CPU can read and write to the RAM 30 and the mass storage device 40, can control the images on the display 50 and the output of the printer 60. For present purposes, either the display 50 or printer 60 can be considered a "display device," since either can display information from the database.

The computer system 10 is at least occasionally connected with source databases 100, 105, such as Derwent, INPADOC, D&B, Thomas Register and the like, and which contain data records which are updated periodically and searched by the computer system 10. The source databases may be databases stored at a remote location, such as a database provider's central facilities, or may be tapes or the like which provide complete copies or weekly updates of the database for local use.

Figure 2:
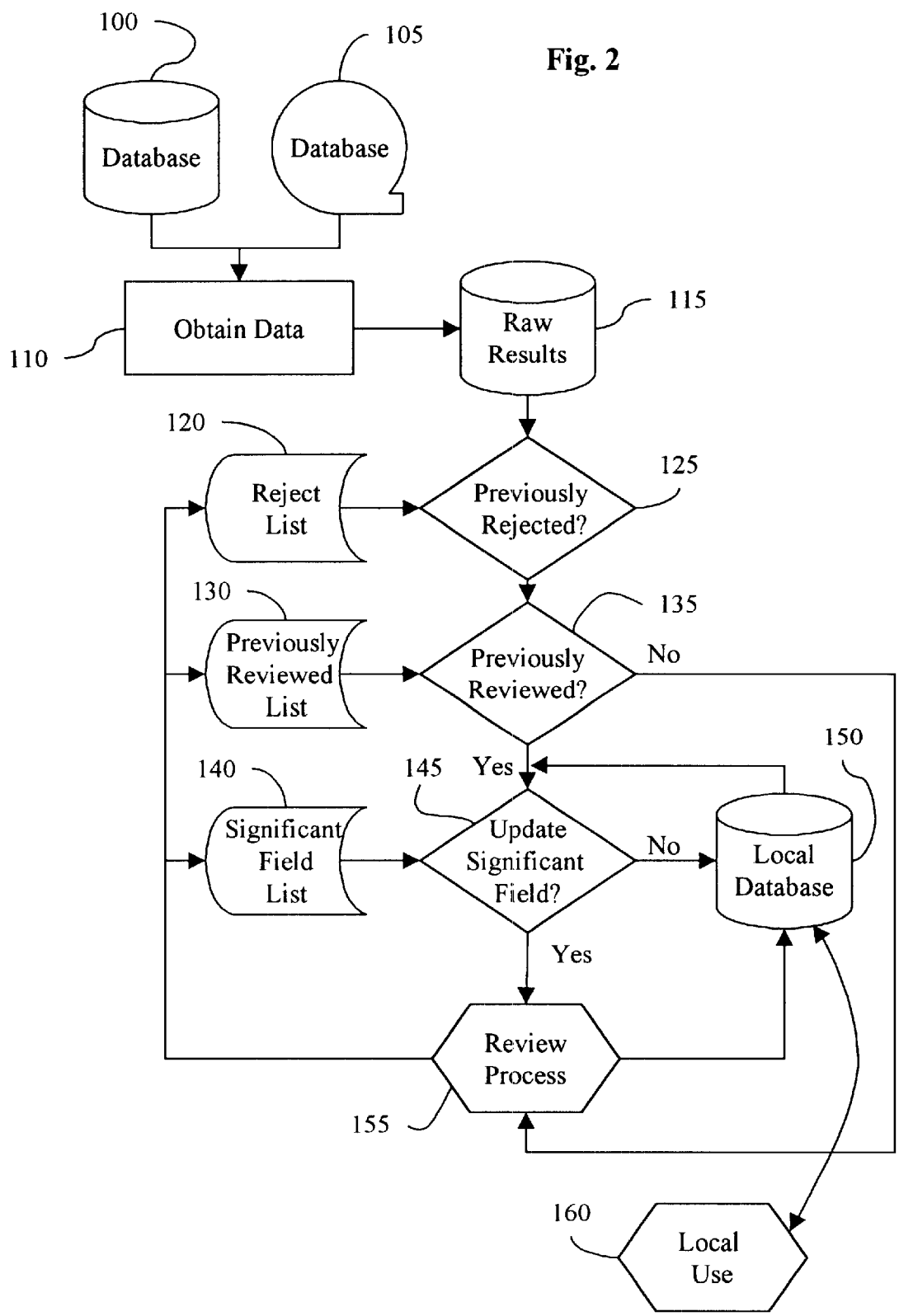
FIG. 2 is a schematic flow chart of the method according to the present invention.

The present invention will be described in greater detail with reference to FIG. 2, in 30 which elements 100 and 105 represent the source databases. At step 110, The CPU 20 is programmed to obtain data from the databases 100, 105, e.g., by running a retrospective search, by downloading information about a specific list of records, or by running a current awareness search against the databases 100, 105 on a regular basis, e.g., weekly or monthly. In the case of a current awareness search, the search typically only pulls records from the database which are new or have been modified since the date of the prior current awareness search.

The data obtained in step 110 is transferred to local storage (in RAM 30 or mass storage 40) as raw results in step 115.

Creation and updating of a reject list 120 representing the unique record identifier number of records previously reviewed and rejected, a previously reviewed list 130 representing the unique record identifying number of all records previously reviewed but not rejected, and a significant field list 140 identifying the particular fields in the database for which the viewer would want to be notified about changes will be described below. For convenience in description, it will be assumed for the moment that such lists already exist.

At step 125, the CPU 20 filters the records in the raw results by comparing the unique record identifier for each record to the record identifiers on the reject list 120. The filtered results then are compared in step 135 to the previously reviewed list 130 to determine whether any of the records have been previously reviewed.

If an individual record has not been previously reviewed, it is sent directly to the review process at step 155. If the individual record has previously been reviewed, it moves to the significant field test in step 145.

In step 145, the prior version of the record is pulled from the local database 150 and compared to the new version of the record from the new current awareness search to identify differences between them. The changes then are compared against the significant field list 140 to determine if they are changes to a significant field.

If a significant field has been updated, the new record is sent to the review process at step 155. If a significant field has not been updated, the record previously stored in the local database 150 is updated with the new information.

In the review process at step 155, at least one reviewer reviews each record which makes it to the review process, and accepts or rejects each record.

If the record is rejected, the unique record identifier is added to the reject list 120, unless there are multiple reviewers. If there are multiple reviewers, some rule governing when to add a record identifier to the reject list 120 is set, such as "add only if all reviewers reject", "add if a particular reviewer rejects", or "add if not all reviewers accept", and applied to add records to the reject list.

If the record is accepted, the unique record identifier is added to the previously reviewed list, and the record itself is added to the local database 150.

In addition, the reviewer preferably has the option of identifying a significant field to add to the significant field list 140, so that the reviewer will be notified of any updates to those fields. The significant field list may be modified as part of the review process or as a separate operation.

If the significant field list is empty for a particular reviewer, the result is that all previously reviewed records which are not rejected will simply be used to update the local database 150. This is functionally equivalent to omitting step 145 as a decision point, and directly feeding the records from step 135 to the local database 150 when they qualify as previously reviewed and not rejected.

If there are multiple reviewers, preferably a reject list is maintained for each reviewer (in addition to the master reject list for the database), and only those updated records for which a significant field has changed that are not on the particular reviewer's reject list will be shown to that reviewer for review.

It will be understood that upon the initial addition of data to the database, the reject list, and the previously reviewed list will both be empty, so that all records from the initial addition will drop directly to the review process. The lists therefore are created for the first time during the review of the first set of search results.

The review process can incorporate additional automatic features based on changes to the added or updated records. For example, a new record or an updated record which is an abstract indicating publication of a new patent can be used to automatically trigger downloading the full text and/or an image of the newly issued patent for inclusion in the local database.

At any time, a local user (who may be the same person as one of the reviewers) may search the local database at step 160. As a result of the review process, the local database is limited to records considered relevant by at least one reviewer, possibly plus any unreviewed records if data is added to and used to update the database before review. As a result, any searches will be of only the known-to-be-relevant records, plus the few irrelevant records that might be in the unreviewed data. In addition, there will be no duplicate records. The result is that analyzing search results will be significantly faster than conducting the same search on the complete source databases.

While the process has been described as if the review takes place before the records are added to the database, it will be understood that records could be added to the database or updated in the database prior to the review. In that situation, the record then preferably is deleted from the database if it subsequently is added to the reject list. Similarly, the previously reviewed, rejected and significant field lists could be maintained as part of the database with the records, not as a separate files. It also will be understood that while reference has been made to a CPU 20 programmed to perform these steps, it could actually be several CPUs on different systems that collectively perform the various steps.

It will be understood that these exemplary embodiments in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

We claim:

1. A method of maintaining local database records through searches of a source database, the method comprising:
   a) providing a local database having a plurality of records, in which each record includes a unique and constant record identifier taken from the source database that maintains records with such unique and constant record identifiers,
   b) providing a reject list of such unique and constant record identifiers for records which a reviewer does not wish to maintain in the local database;
   c) obtaining new or updated data from the source database;
   d) comparing the record identifier for each record in the results of the new or updated records with the reject list, and filtering from the results all records which match the reject list;
   e) by means of a programmed system, comparing the record identifier for each record in the filtered results from step d) to the record identifiers of the records in the local database;
   f) by means of a programmed system, updating the corresponding local database record for each record which is in the local database; and
   g) providing any remaining records to a reviewer.

2. A method of maintaining local database records through searches of a source database, the method comprising:
   a) providing a local database having a plurality of records, in which each record includes a unique and constant record identifier, taken from the source database that maintains records with such unique and constant record identifiers;
   b) providing a reject list of such unique and constant record identifiers for records which a reviewer does not wish to maintain in the local database;
   c) by means of a programmed system, obtaining new or updated data from the source database, the source database including the same unique and constant record identifiers as the local database;
   d) by means of a programmed system, comparing the record identifier for each record in the results of the new or updated records with the reject list, and filtering from the results all records which match the reject list;
   e) comparing the record identifier for each record in the filtered results from step d) to the record identifiers of the records in the local database;
   f) updating the corresponding local database record for each record which is in the local database;
   g) providing any remaining records to a reviewer;
   h) having at least one reviewer accept or reject each record;
   i) adding to the reject list the record identifier of each record rejected according to a method selected from:

i) add to the list only if all reviewers reject the record;
ii) add to the list if a particular reviewer rejects the record; and
iii) add to the list if not all reviewers accept the record; and
j) adding to the local database each record not added to the reject list.

3. The method of claim 2, further comprising;
providing a previously reviewed list, the previously reviewed list including the record identifier of each record in the local database, wherein the step e) of comparing the record identifier for each record in the filtered results to the record identifiers in the local database is carried out by comparing the record identifier for each record in the filtered results to the previously reviewed list; and
adding to the previously reviewed list the record identifier for each record added to the local database.

4. A method of maintaining database records, the method comprising:
a) providing a local database having a plurality of records, in which each record includes a unique and constant record identifier taken from the source database that maintains records with such unique and constant record identifiers;
b) providing a reject list of such unique record identifiers for records which a reviewer does not wish to maintain in the local database;
c) obtaining new or updated data from a source database, the source database including the same unique record identifiers as the local database;
d) comparing the record identifier for each record in the results of the new or updated records with the reject list, and filtering from the results all records which match the reject list;
e) comparing the record identifier for each record in the filtered results from step d) to the record identifiers of the records in the local database;
f) updating the corresponding local database record for each record which is in the local database;
g) providing any remaining records to a reviewer;
h) having at least one reviewer accept or reject each record;
i) adding to the reject list the record identifier of each record rejected according to a method selected from:
i) add to the list only if all reviewers reject the record;
ii) add to the list if a particular reviewer rejects the record; and
iii) add to the list if not all reviewers accept the record; and
j) adding to the local database each record not added to the reject list; said method further comprising the steps of:
k) providing a list of significant fields in the records;
l) comparing each previously reviewed record to the prior version of the record in the local database to identify the changes between the prior version and the new version;
m) comparing the changes to the record to the list of significant fields to determine if a significant field has been updated; and
n) if a significant field has been updated, providing the record to at least one reviewer.

5. The method of claim 4, wherein a separate reject list is maintained for each reviewer, and even a record for which a significant field has been updated is not shown to the particular reviewer if it is on that reviewer's reject list.

6. A system for maintaining a local database, comprising:
a) at least one display device readable by at least one reviewer;
b) at least one mass storage device drive having thereon:
i) a local database comprising a plurality of records, each record having a unique and constant record identifier taken from a source database that maintains records with such unique and constant identifiers; and
ii) a reject list of such unique record identifiers for records which a reviewer does not wish to maintain records in the local database;
c) at least one central processing unit programmed to:
i) obtain new or updated data from the source database;
ii) compare the record identifier for each record in the results of step c)i) with the reject list, and filtering from the results all records which match the reject list;
iii) compare the record identifier for each record in the filtered results to the record identifiers of the records in the local database;
iv) write to the mass storage device to update the corresponding local database record for each record which is in the local database; and
v) display any remaining records to the reviewer on the display device.

7. A system for maintaining a database, comprising:
a) at least one display device readable by at least one reviewer;
b) at least one mass storage device having thereon:
i) a local database comprising a plurality of records, each record having a unique and constant record identifier, taken from a source database that maintains records with such unique and constant record identifiers;
ii) a reject list of record identifiers for records which a reviewer does not wish to maintain records in the local database;
c) at least one central processing unit programmed to:
i) obtain new or updated data from the source database that maintains records with the same unique and constant record identifiers;
ii) compare the record identifier for each record in the results of step c) i) with the reject list, and filtering from the results all records which match the reject list;
iii) compare the record identifier for each record in the filtered results to the record identifiers of the records in the local database;
iv) write to the mass storage device to update the corresponding local database record for each record which is in the local database;
d) display any remaining records on the display device;
e) receive from at least one reviewer an accept or reject indication for each record displayed;
f) write to the mass storage device to add to the reject list the record identifier of each record rejected according to a method selected from:
i) add to the list only if all reviewers reject the record;
ii) add to the list if a particular reviewer rejects the record; and
iii) add to the list if not all reviewers accept the record; and
g) write to the local database each record not added to the reject list.

8. A system for maintaining a database, comprising:
a) at least one display device readable by at least one reviewer;
b) at least one mass storage device having thereon:
   i) a local database comprising a plurality of records, each record having a unique and constant record identifier; taken from a source database that maintains records with such unique and constant record identifiers; and
   ii) a reject list of record identifiers for records which a reviewer does not wish to maintain records in the local database;
c) at least one central processing unit programmed to:
   i) obtain new or updated data from the source database, the source database including the same unique and constant record identifiers as the local database;
   ii) compare the unique record identifier for each record in the results of step c) i) with the reject list, and filtering from the results all records for which the unique record identifier matches the reject list;
   iii compare the unique-record identifier for each record in the filtered results from step c)ii) to the record identifiers of the records in the local database;
   iv) write to the mass storage device to update the corresponding local database record for each record which is in the local database;
d) display any remaining records on the display device;
e) receive from at least one reviewer an accept or reject indication for each record displayed;
f) write to the mass storage device to add to the reject list the record identifier of each record rejected according to a method selected from:
   i) add to the list only if all reviewers reject the record;
   ii) add to the list if a particular reviewer rejects the record; and
   iii) add to the list if not all reviewers accept the record: and
g) write to the local database each record not added to the reject list;
wherein the mass storage device further has a list of significant fields in the records stored thereon, and wherein the central processing unit is further programmed to:
h) compare each previously reviewed record to the prior version of the record in the local database to identify the changes between the prior version arid the new version;
i) compare the changes to the record to the list of significant fields to determine if a significant field has been updated; and
j) if a significant field has been updated, display the record for at least one reviewer on the display device.

9. Data storage media containing software which, when installed on a suitable computer system, will cause the system to maintain local database records by the method comprising:
a) providing a local database having a plurality of records, in which each record includes a unique and constant record identifier taken from a source database that maintains records with the same unique and constant record identifiers;
b) providing a reject list of such unique record identifiers for records of which a reviewer does not wish to maintain in the local database;
c) obtaining new or updated data from the source database;
d) comparing the record identifier for each record in the results of the new or updated records with the reject list, and filtering from the results all records which match the reject list;
e) comparing the record identifier for each record in the filtered results to the record identifiers of the records in the local database;
f) updating the corresponding local database record for each record which is in the local database;
g) providing any remaining records to a reviewer
h) having the reviewer accept or reject each record;
i) adding to the reject list the record identifier of each record rejected according to a method selected from:
   i) add to the list only if all reviewers reject the record;
   ii) add to the list if a particular reviewer rejects the record; and
   iii) add to the list if not all reviewers accept the record; and
j) adding to the local database each record accepted by the reviewer.

10. Data storage media containing software which, when installed on a suitable computer system, will cause the system to maintain database records by the method comprising:
a) providing a local database having a plurality of records, in which each record includes a unique and constant record identifier taken from a source database;
b) providing a reject list of such unique record identifiers for records of which a reviewer does not wish to maintain in the local database;
c) obtaining new or updated data from the source database;
d) comparing the record identifier for each record in the results of the new or updated records with the reject list, and filtering from the results all records which match the reject list;
e) comparing the record identifier for each record in the filtered results to the record identifiers of the records in the local database;
f) updating the corresponding local database record for each record which is in the local database;
g) providing any remaining records to a reviewer
h) having the reviewer accept or reject each record;
i) adding to the reject list the record identifier of each record rejected according to a method selected from:
   i) add to the list only if all reviewers reject the record;
   ii) add to the list if a particular reviewer rejects the record; and
   iii) add to the list if not all reviewers accept the record; and
j) adding to the local database each record accepted by the reviewer; wherein the method further comprises the steps of:
k) providing a list of significant fields in the records;
l) comparing each previously reviewed record to the prior version of the record in the local database to identify the changes between the prior version and the new version;
m) comparing the changes to the record to the list of significant fields to determine if a significant field has been updated; and
n) if a significant field has been updated, providing the record to at least one reviewer.

11. The data storage media of claim 10, wherein a separate reject list is maintained for each reviewer, and even a record for which a significant field has been updated is not provided to the particular reviewer if it is on that reviewer's reject list.

* * * * *

UNITED STATES PATENT AND TRADEMARK OFFICE
CERTIFICATE OF CORRECTION

PATENT NO. : 6,697,822 B1
DATED : February 24, 2004
INVENTOR(S) : Armatis, Kathleen C.

It is certified that error appears in the above-identified patent and that said Letters Patent is hereby corrected as shown below:

Column 4,
Line 21, delete "30" after "in".

Column 8,
Line 36, after "identifiers;" insert -- and --.

Column 9,
Line 46, delete "arid" and insert in place thereof -- and --.

Signed and Sealed this

Sixth Day of September, 2005

JON W. DUDAS
*Director of the United States Patent and Trademark Office*